US010327140B2

United States Patent
Li et al.

(10) Patent No.: US 10,327,140 B2
(45) Date of Patent: Jun. 18, 2019

(54) FEMTOCELL AND FEMTOCELL SUBSCRIBER AUTHENTICATION METHOD

(71) Applicant: Huawei Technologies Co., Ltd., Shenzhen (CN)

(72) Inventors: Yingtao Li, Shenzhen (CN); Rongdao Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/583,587

(22) Filed: May 1, 2017

(65) Prior Publication Data

US 2017/0238180 A1    Aug. 17, 2017

Related U.S. Application Data

(63) Continuation of application No. PCT/CN2015/088174, filed on Aug. 26, 2015.

(51) Int. Cl.
*H04W 8/18* (2009.01)
*H04W 12/06* (2009.01)
*H04W 48/08* (2009.01)
*H04W 84/04* (2009.01)

(52) U.S. Cl.
CPC ........... *H04W 12/06* (2013.01); *H04W 48/08* (2013.01); *H04W 84/045* (2013.01); *H04W 8/186* (2013.01)

(58) Field of Classification Search
USPC ............ 370/388; 455/433, 435.1–435.3, 444
See application file for complete search history.

(56) References Cited

U.S. PATENT DOCUMENTS

| 2009/0104905 A1* | 4/2009 | DiGirolamo | 455/434 |
| 2009/0111427 A1* | 4/2009 | Mack | H04W 60/00 455/411 |
| 2010/0112982 A1* | 5/2010 | Singh | H04L 63/101 455/411 |

(Continued)

FOREIGN PATENT DOCUMENTS

| CN | 101932049 A | 12/2010 |
| CN | 102547696 A | 7/2012 |

OTHER PUBLICATIONS

3GPP TS 25.467 V12.3.0 (Dec. 2014), 3rd Generation Partnership Project; Technical Specification Group Radio Access Network; UTRAN architecture for 3G Home Node B (HNB); Stage 2 (Release 12), 91 pages.

*Primary Examiner* — Joshua L Schwartz (57) ABSTRACT

A femtocell subscriber includes: receiving, by a femtocell, an access request sent by an access terminal, where the access request carries IMSI information of the access terminal; determining, by the femtocell, whether an international mobile subscriber identity IMSI of the access terminal is in a CSG subscriber list of the femtocell; if the access terminal is in the closed subscriber group CSG subscriber list, allowing the access terminal to access the femtocell; or if the IMSI of the access terminal is not in the CSG subscriber list of the femtocell, obtaining, by the femtocell from a server, a mobile phone number corresponding to the IMSI; if the mobile phone number of the access terminal is not in the CSG subscriber list of the femtocell, requesting, by the femtocell, a management terminal to determine whether to allow the access terminal to access the femtocell.

6 Claims, 5 Drawing Sheets

(56) References Cited

U.S. PATENT DOCUMENTS

| | | |
|---|---|---|
| 2010/0190498 A1 | 7/2010 | Ha et al. |
| 2010/0298023 A1 | 11/2010 | Jacobsohn et al. |
| 2011/0244857 A1 | 10/2011 | Hsieh et al. |
| 2012/0030734 A1 | 2/2012 | Wohlert |
| 2012/0108244 A1 | 5/2012 | Shi et al. |

* cited by examiner

FEMTOCELL AND FEMTOCELL SUBSCRIBER AUTHENTICATION METHOD

CROSS-REFERENCE TO RELATED APPLICATIONS

This application is a continuation of International Application No. PCT/CN2015/088174, filed on Aug. 26, 2015, the disclosure of which is hereby incorporated by reference in its entirety.

TECHNICAL FIELD

The present application relates to a communication control and management method in a wireless communications network, and in particular, to a femtocell and a femtocell subscriber authentication method.

BACKGROUND

With development and popularization of smartphones, data service volumes of mobile communication are increasing. Particularly, as people increasingly use applications such as Microblog, WeChat, Facebook, and Twitter, it becomes increasingly difficult for traditional cellular communication to meet increasing communication service volume requirements of the people. According to statistics, in global mobile communication, approximately 70 percent of data services occur indoors, which indicates that most of broadband data services of people, such as a video service, an online game playing, or Microblog or WeChat browsing, occurs in an indoor environment. Therefore, it is particularly important to expand indoor signal coverage of an indoor subscriber and enhance subscriber experience. In recent years, femtocells have attracted wide attention from the communications field. The femtocell is a small and low-power base station, and may provide a wireless communication service for a mobile terminal based on an existing 3G or 4G wireless standard protocol. The femtocell is mainly deployed in public places such as a market, an office, and a coffee shop, or inside a home. The femtocell can compensate for an indoor coverage disadvantage of a macro base station, and avoid a difficulty in selecting a macro base station location, and the femtocell may perform transmission at lower power than the macro base station. Therefore, the femtocell is more environment-friendly.

Figure 1:
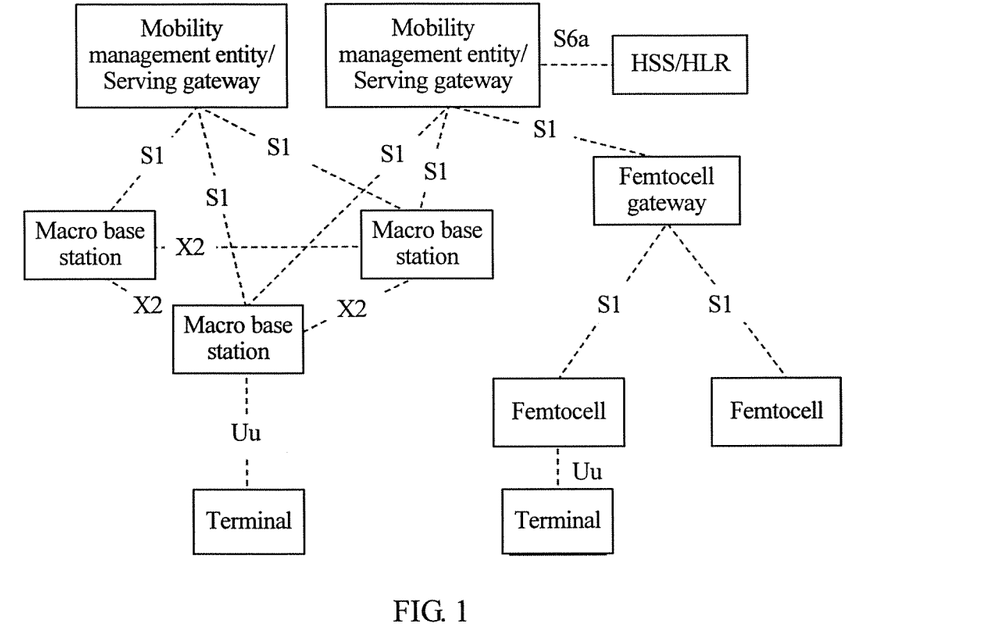
FIG. 1 is a schematic diagram of a wireless network communications system in the prior art.

In the prior art, as a small and low-power base station, a femtocell provides a communication service for a mobile subscriber. As shown in FIG. 1, a femtocell accesses a mobility management entity (MME)/serving gateway (SGW) by using a femtocell gateway, to access a core network, and the femtocell provides a wireless communication service for a terminal in a coverage area of the femtocell. There is an interface S1 between a macro base station and the MME/SGW, there is an interface X2 between macro base stations, the macro base station accesses the core network by using the MME/SGW, and the macro base station provides a wireless communication service for a terminal in a coverage area of the macro base station. Information about a femtocell subscriber is generally stored in a Home Subscriber Server HSS or a Home Location Register HLR and the femtocell subscriber is managed by using the HSS or the HLR.

Because a femtocell is generally deployed indoors, particularly in a home, a home subscriber server HSS or a home location register HLR is generally deployed by an operator, and the femtocell deployed inside the home is generally a device exclusive to the home, if a subscriber is managed by using the home subscriber server or the location register of the operator, great inconvenience is caused in subscriber authentication.

SUMMARY

Embodiments of the present application provide a femtocell and a femtocell subscriber authentication method, so as to implement convenient authentication on the femtocell by using a terminal.

According to a first aspect, a femtocell subscriber authentication method is provided, and the method includes:

receiving, by a femtocell, an access request sent by an access terminal, where the access request carries International Mobile Subscriber Identity IMSI information of the access terminal;

determining, by the femtocell, whether an IMSI of the access terminal is in a CSG subscriber list of the femtocell; and if the access terminal is in the closed subscriber group CSG subscriber list, allowing the access terminal to access the femtocell; or if the IMSI of the access terminal is not in the CSG subscriber list of the femtocell, obtaining, by the femtocell from a server, a mobile phone number corresponding to the IMSI; and when the mobile phone number of the access terminal is not in the CSG subscriber list of the femtocell, requesting, by the femtocell, a management terminal to determine whether to allow the access terminal to access the femtocell; and receiving, by the femtocell, a determining result of the management terminal, and determining, according to the determining result, whether to allow the access terminal to access the femtocell.

With reference to the first aspect, in a first implementation manner of the first aspect, the server includes a home subscriber server HSS or a home location register HLR, and the obtaining, by the femtocell from a server, a mobile phone number corresponding to the IMSI includes:

requesting, by the femtocell, subscription information of the access terminal from the home subscriber server HSS or the home location register HLR; and receiving, by the femtocell, the subscription information of the access terminal from the HSS or the HLR, and obtaining, by parsing the subscription information, the mobile phone number that is of the access terminal and corresponding to the IMSI.

According to a second aspect, a femtocell subscriber authentication method is provided, and the method includes:

receiving, by a management terminal, a determining request of a femtocell, where the determining request includes that the femtocell requests the management terminal to determine whether to allow the access terminal to access the femtocell, and the determining request carries an identifier ID of the access terminal or a mobile phone number of the access terminal; and presenting, by the management terminal to a subscriber of the management terminal, a dialog box about whether to allow the access terminal to access the femtocell or be added to a CSG subscriber list of the femtocell; and when the subscriber performs an operation of choosing to allow access, sending, to the femtocell, a determining result that the access terminal is allowed to access the femtocell; or when the subscriber performs an operation of choosing to reject access, sending, to the femtocell, a determining result that the access terminal is not allowed to access the femtocell; or matching, by the management terminal, the mobile phone number of the access terminal and a contact or a call record of the management terminal; and when the mobile phone number of the access terminal is in the contact or the call record of the management terminal, sending, to the femtocell, a determining result that the access terminal is allowed to access the femtocell; or when the mobile phone number of the access terminal is not in the contact or the call record of the management terminal, sending, to the femtocell, a determining result that the access terminal is not allowed to access the femtocell.

With reference to the second aspect, in a first implementation manner of the second aspect, the step of matching, by the management terminal, the mobile phone number of the access terminal and a contact or a call record of the management terminal; and when the mobile phone number of the access terminal is in the contact or the call record of the management terminal, sending, to the femtocell, a determining result that the access terminal is allowed to access the femtocell; or when the mobile phone number of the access terminal is not in the contact or the call record of the management terminal, sending, to the femtocell, a determining result that the access terminal is not allowed to access the femtocell includes: when the access number of the access terminal is in the call record of the management terminal, determining, by the management terminal, whether a quantity of call records or call duration of the access terminal exceeds a preset value; and when the quantity of call records or the call duration of the access terminal exceeds the preset value, sending, to the femtocell, the determining result that the access terminal is allowed to access the femtocell; or when the quantity of call records or the call duration of the access terminal does not exceed the preset value, sending, to the femtocell, the determining result that the access terminal is not allowed to access the femtocell.

According to a third aspect, a femtocell and a femtocell subscriber authentication method are provided, and the method includes:

initiating, by a terminal, an access request to the femtocell, where the terminal is referred to as an access terminal, and the access request carries international mobile subscriber identity (IMSI, International Mobile Subscriber Identity) information of the access terminal;

after receiving the access request of the access terminal, determining, by the femtocell, whether an IMSI of the access terminal is in a CSG subscriber list of the femtocell; and when the access terminal is in the CSG subscriber list, allowing the access terminal to access the femtocell; or when the IMSI of the access terminal is not in the CSG subscriber list of the femtocell, obtaining, by the femtocell from a server, a mobile phone number corresponding to the IMSI;

when the mobile phone number of the access terminal is not in the CSG subscriber list of the femtocell, requesting a management terminal to determine whether to allow the access terminal to access the femtocell;

after receiving, from the femtocell, a request message for requesting to determine whether to allow the access terminal to access the femtocell, determining, by the management terminal, whether to allow the access terminal to access the femtocell, and sending the determining result to the femtocell; and when the management terminal allows the access terminal to access the femtocell, sending, by the femtocell to the access terminal, a response message indicating that access is allowed or when the management terminal does not allow the access terminal to access the femtocell, sending, by the femtocell to the access terminal, a response message indicating that access of the access terminal to the femtocell is rejected.

With reference to the third aspect, in a first implementation manner of the third aspect, the server includes a home subscriber server HSS or a home location register HLR, and the obtaining, by the femtocell from a server, a mobile phone number corresponding to the IMSI includes:

requesting, by the femtocell, subscription information of the access terminal from the home subscriber server HSS or the home location register HLR; and receiving, by the femtocell, the subscription information of the access terminal from the HSS or the HLR, and obtaining, by parsing the subscription information, the mobile phone number that is of the access terminal and corresponding to the IMSI.

According to a fourth aspect, a femtocell subscriber authentication method is provided, and the method includes:

broadcasting, by a femtocell, a closed subscriber group identity (CSG ID, Closed Subscriber Group Identity) of the femtocell, where only a terminal that belongs to the closed subscriber group can access the femtocell;

receiving, by the femtocell, a request of an access terminal, where the request includes that the access terminal requests a current closed subscriber group subscriber list of the femtocell from the femtocell;

determining, by the femtocell, whether the access terminal has permission to manage the closed subscriber group subscriber list of the femtocell; and when the access terminal has the permission to manage the closed subscriber group subscriber list of the femtocell, feeding back the current closed subscriber group subscriber list of the femtocell to the terminal, where the closed subscriber group subscriber list fed back by the femtocell includes a mobile phone number of at least one terminal; and receiving, by the femtocell, the modified closed subscriber group subscriber list of the femtocell that is sent by the access terminal, where the modification includes adding, deleting, or changing, by the access terminal, a subscriber in the closed subscriber group subscriber list of the femtocell.

According to a fifth aspect, a femtocell subscriber authentication method is provided, and the method includes:

receiving, by a terminal, a closed subscriber group identity broadcast by a femtocell, and determining whether the closed subscriber group identity is in a closed subscriber group identity list stored in the terminal; and when the closed subscriber group identity is in the closed subscriber group identity list stored in the terminal, sending, by the terminal, an access request to the femtocell;

after successfully accessing the femtocell, requesting, by the terminal, a current closed subscriber group subscriber list of the femtocell from the femtocell; and managing, by the terminal after receiving the closed subscriber group subscriber list of the femtocell, the closed subscriber group subscriber list of the femtocell, where the management includes adding, deleting, or changing a subscriber in the subscriber list.

With reference to the fifth aspect, in a first implementation manner of the fifth aspect, the managing, by the terminal after receiving the closed subscriber group subscriber list of the femtocell, the closed subscriber group subscriber list of the femtocell includes:

obtaining, by the terminal, schedule information from a schedule of a management terminal to determine whether a visitor performs access and determine a mobile phone number and an access time of the visitor; and before the visitor performs access, according to the access time of the visitor, instructing the femtocell to add the mobile phone number of the visitor to the closed subscriber group subscriber list of the femtocell; and after the access time elapses, instructing the femtocell to delete the mobile phone number of the visitor from the closed subscriber group subscriber list.

With reference to the fifth aspect or the first implementation manner of the fifth aspect, in a second implementation manner of the fifth aspect, the managing, by the terminal after receiving the closed subscriber group subscriber list of the femtocell, the closed subscriber group subscriber list of the femtocell includes:

requesting the femtocell to detect whether a terminal subscriber in the closed subscriber group subscriber list is in a coverage area of the femtocell; and when in a specific time period, the terminal subscriber does not report measurements or does not access the femtocell, instructing the femtocell to delete the terminal subscriber from the closed subscriber group subscriber list of the femtocell, where the period is longer than a scheduling period of the femtocell in a wireless communications system.

With reference to the fifth aspect or the first implementation manner of the fifth aspect or the second implementation manner of the fifth aspect, in a third implementation manner of the fifth aspect, the managing, by the terminal after receiving the closed subscriber group subscriber list of the femtocell, the closed subscriber group subscriber list of the femtocell includes:

presenting the subscriber list in an interface that is of the terminal and for managing the closed subscriber group subscriber list; when the closed subscriber group subscriber list fed back by the femtocell includes a subscriber ID and a mobile phone number, directly displaying the subscriber ID and the mobile phone number; or when the closed subscriber group subscriber list fed back by the femtocell includes only a mobile phone number, performing matching between the mobile phone number fed back by the femtocell and a mobile phone number of a contact in the terminal; and when a mobile phone number of a contact in the terminal matches the mobile phone number fed back by the femtocell, displaying an ID of the matched contact in the subscriber ID; or when no mobile phone number of a contact in the terminal matches the mobile phone number fed back by the femtocell, displaying the subscriber ID as empty.

With reference to the fifth aspect or any one of the first to the third implementation manners of the fifth aspect, in a fourth implementation manner of the fifth aspect, the managing, by the terminal after receiving the closed subscriber group subscriber list of the femtocell, the closed subscriber group subscriber list of the femtocell includes:

selecting, from a contact list of the terminal, a contact and a mobile phone number corresponding to the contact that need to be added, or only a mobile phone number that needs to be added; adding the selected contact and the selected mobile phone number corresponding to the contact or only the selected mobile phone number to a closed subscriber group subscriber list of the terminal; sending, to the femtocell, information about the added contact and the added mobile phone number, or only the mobile phone number that needs to be added; and instructing the femtocell to add the contact and the mobile phone number or only the mobile phone number to the closed subscriber group subscriber list of the femtocell.

According to a sixth aspect, a femtocell is provided, and the femtocell includes:

a receiving module, configured to receive an access request sent by an access terminal, where the access request carries IMSI information of the access terminal;

a sending module, configured to send information to a terminal or another base station;

a storage module, configured to store a CSG subscriber list; and a processing module, configured to: determine whether an international mobile subscriber identity IMSI of the access terminal is in the CSG subscriber list stored in the storage module; when the access terminal is in the closed subscriber group CSG subscriber list, allow the access terminal to access the femtocell; or when the IMSI of the access terminal is not in the CSG subscriber list of the femtocell, obtain, from a server by using the sending module and the receiving module, a mobile phone number corresponding to the IMSI; and when the mobile phone number of the access terminal is not in the CSG subscriber list of the femtocell, send a request to a management terminal by using the sending module, to request the management terminal to determine whether to allow the access terminal to access the femtocell; where the processing module determines, according to a determining result of the management terminal that is received by the receiving module, whether to allow at least one of the IMSI of the access terminal or the mobile phone number of the access terminal to be added to the CSG subscriber list of the femtocell.

According to a seventh aspect, a terminal is provided, and the terminal includes:

a receiving module, configured to receive a determining request of a femtocell, where the determining request includes that the femtocell requests the management terminal to determine whether to allow the access terminal to access the femtocell, and the determining request carries an identifier ID of the access terminal or a mobile phone number of the access terminal;

a storage module, configured to store the CSG subscriber list, a contact, and a call record;

a presentation module, configured to present, to a subscriber of the terminal, a dialog box about whether to allow the access terminal to access the femtocell or be added to the CSG subscriber list of the femtocell;

a sending module, configured to: when the subscriber performs an operation of choosing to allow access, send, to the femtocell, a determining result that the access terminal is allowed to access the femtocell; or when the subscriber performs an operation of choosing to reject access, send, to the femtocell, a determining result that the access terminal is not allowed to access the femtocell; and a processing module, configured to: match the mobile phone number of the access terminal and the contact or the call record stored in the storage module; and when the mobile phone number of the access terminal is in the contact or the call record of the management terminal, send, to the femtocell by using the sending module, the determining result that the access terminal is allowed to access the femtocell; or when the mobile phone number of the access terminal is not in the contact or the call record, send, to the femtocell by using the sending module, the determining result that the access terminal is not allowed to access the femtocell.

According to an eighth aspect, a wireless communications system is provided, including a femtocell, an access terminal, and a management terminal; where the access terminal initiates an access request to the femtocell, where the access request carries international mobile subscriber identity (IMSI, International Mobile Subscriber Identity) information of the access terminal;

after receiving the access request of the access terminal, the femtocell determines whether an IMSI of the access terminal is in a CSG subscriber list of the femtocell; and when the access terminal is in the CSG subscriber list, the femtocell allows the access terminal to access the femtocell; or when the IMSI of the access terminal is not in the CSG subscriber list of the femtocell, the femtocell obtains, from a server, a mobile phone number corresponding to the IMSI;

when the mobile phone number of the access terminal is not in the CSG subscriber list of the femtocell, the management terminal is requested to determine whether to allow the access terminal to access the femtocell;

after receiving, from the femtocell, a request massage for requesting to determine whether to allow the access terminal to access the femtocell, the management terminal determines whether to allow the access terminal to access the femtocell, and sends the determining result to the femtocell; and when the management terminal allows access of the access terminal, the femtocell sends, to the access terminal, a response message indicating that access is allowed.

According to a ninth aspect, a femtocell is provided, and the femtocell includes:

a sending module, configured to broadcast a closed subscriber group identity (CSG ID, Closed Subscriber Group Identity) of the femtocell, where only a terminal that belongs to the closed subscriber group can access the femtocell;

a receiving module, configured to receive a request of an access terminal, where the request includes that the access terminal requests a current closed subscriber group subscriber list of the femtocell from the femtocell;

a storage module, configured to store the CSG ID and the current closed subscriber group subscriber list; and a processing module, configured to: determine whether the access terminal has permission to manage the closed subscriber group subscriber list of the femtocell; and when the access terminal has the permission to manage the closed subscriber group subscriber list of the femtocell, feed back the current closed subscriber group subscriber list of the femtocell to the terminal, where the closed subscriber group subscriber list fed back by the femtocell includes a mobile phone number of at least one terminal; where the receiving module is further configured to receive the modified closed subscriber group subscriber list of the femtocell that is sent by the access terminal, where the modification includes adding, deleting, or changing, by the access terminal, a subscriber in the closed subscriber group subscriber list of the femtocell.

According to a tenth aspect, a terminal is provided, and the terminal includes:

a receiving module, configured to receive a closed subscriber group identity broadcast by a femtocell;

a sending module, configured to send information to the femtocell;

a storage module, configured to store a closed subscriber group identity list; and a processing module, configured to: determine whether the closed subscriber group identity is in the closed subscriber group identity list stored in the storage module; and when the closed subscriber group identity is in the closed subscriber group identity list stored in the storage module, send an access request to the femtocell by using the sending module; where after the terminal successfully accesses the femtocell, the processing module requests a current closed subscriber group subscriber list of the femtocell from the femtocell by using the sending module; and after the receiving module receives the closed subscriber group subscriber list of the femtocell, the processing module manages the closed subscriber group subscriber list of the femtocell, where the management includes adding, deleting, or changing a subscriber in the subscriber list.

In the embodiments of the present application, a CSG subscriber list is managed by using a management terminal, so that a femtocell is managed conveniently, where the management terminal has a capability of managing a CSG subscriber list of the femtocell, that is, may add, delete, or update a subscriber in the CSG subscriber list of the femtocell. Therefore, a femtocell subscriber is managed conveniently, updated, and maintained.

DETAILED DESCRIPTION

The following further describes the technical solutions of the present application in detail by using the accompanying drawings and embodiments.

Figure 2:
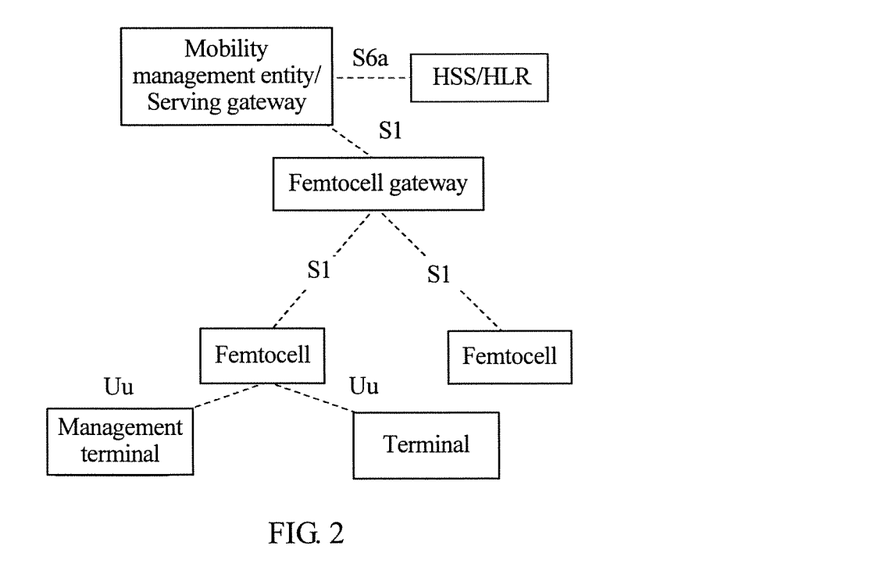
FIG. 2 is a schematic diagram of a wireless network communications system according to the present application.

As shown in FIG. 2, an embodiment of the present application provides a femtocell subscriber authentication method, where a femtocell (Femto or Femtocell or Home eNodeB) is a small and low-power base station, and may be based on an existing 3G or 4G wireless standard protocol or even a future 5G wireless standard protocol. A closed subscriber group (CSG, Closed Subscriber Group) subscriber list of the femtocell is stored in the femtocell, and only a subscriber in the closed subscriber group subscriber list can access the femtocell by using an air interface Uu between a terminal and the femtocell. Therefore, the femtocell is mainly managed by means of CSG subscriber list management.

In the embodiments of the present application, a CSG subscriber list is managed by using a management terminal, so that a femtocell is managed conveniently, where the management terminal has a capability of managing a CSG subscriber list of the femtocell, that is, may add, delete, or update a subscriber in the CSG subscriber list of the femtocell. Therefore, a femtocell subscriber is managed conveniently, updated, and maintained. The femtocell is connected to a femtocell gateway by using an S1 interface, and the femtocell gateway is responsible for collecting and forwarding signaling and data between the femtocell and a core network. The femtocell gateway is connected to a mobility management entity (MME)/serving gateway (SGW) by using an S1 interface, and the MME/SGW is responsible for mobility management on the subscriber and routing and forwarding of a subscriber data packet, where the MME communicates with a home subscriber server (Home Subscriber Server, HSS) or a home location register (Home Location Register, HLR) by using an S6a interface, and subscription data and related information of the subscriber are stored in the HSS or the HLR.

Embodiment 1

Figure 3:
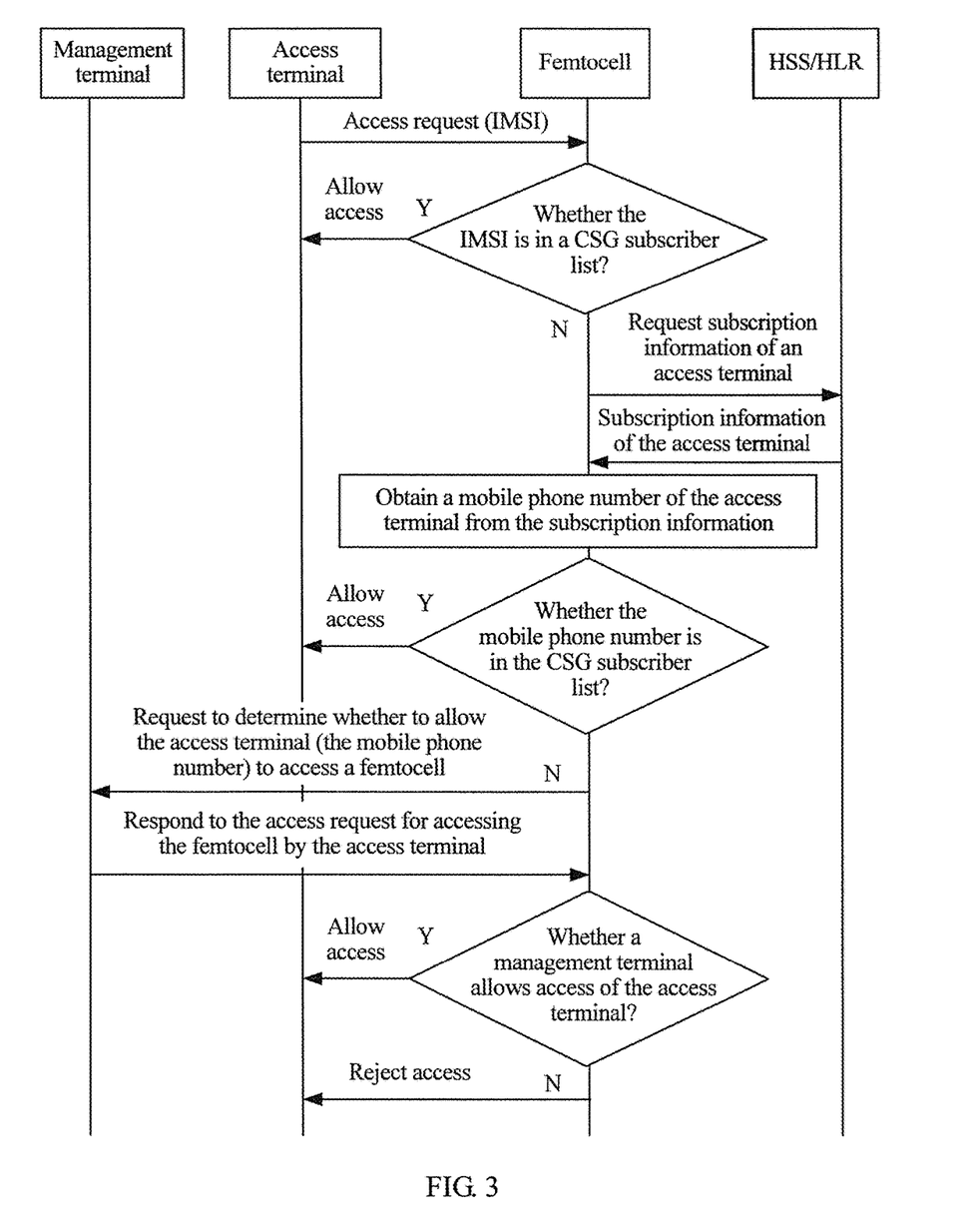
FIG. 3 is a schematic flowchart of a femtocell subscriber authentication method according to Embodiment 1 of the present application.

As shown in FIG. 3, Embodiment 1 of the present application provides a femtocell and a femtocell subscriber authentication method, and the method includes the following steps:

Step 101: When a terminal enters a coverage area of a femtocell, the terminal initiates an access request to the femtocell, where the terminal is referred to as an access terminal, and the access request carries international mobile subscriber identity (IMSI, International Mobile Subscriber Identity) information of the access terminal.

Step 102: After receiving the access request of the access terminal, the femtocell determines whether an IMSI of the access terminal is in a CSG subscriber list of the femtocell; and when the access terminal is in the CSG subscriber list, allows the access terminal to access the femtocell; or when the IMSI of the access terminal is not in the CSG subscriber list of the femtocell, the femtocell requests subscription information of the access terminal from an HSS or an HLR.

Step 103: The femtocell receives the subscription information of the access terminal from the HSS or the HLR, and obtains, by parsing the subscription information, a mobile phone number that is of the access terminal and corresponding to the IMSI.

Step 104: When the mobile phone number of the access terminal is not in the CSG subscriber list of the femtocell, request a management terminal to determine whether to allow the access terminal to access the femtocell.

Step 105: After receiving, from the femtocell, a request message for requesting to determine whether to allow the access terminal to access the femtocell, the management terminal determines whether to allow the access terminal to access the femtocell, and sends the determining result to the femtocell.

Step 106: When the management terminal allows the access terminal to access the femtocell, the femtocell sends, to the access terminal, a response message indicating that access is allowed, and may add at least one of the IMSI of the access terminal or the mobile phone number of the access terminal to the CSG subscriber list of the femtocell.

In one aspect, in the foregoing femtocell subscriber authentication method:

the femtocell receives the access request sent by the access terminal, where the access request carries the IMSI information of the access terminal;

the femtocell determines whether the IMSI of the access terminal is in the CSG subscriber list of the femtocell; and when the access terminal is in the CSG subscriber list, allows the access terminal to access the femtocell; or when the IMSI of the access terminal is not in the CSG subscriber list of the femtocell, the femtocell obtains, from a server, the mobile phone number corresponding to the IMSI;

when the mobile phone number of the access terminal is not in the CSG subscriber list of the femtocell, the management terminal is requested to determine whether to allow the access terminal to access the femtocell; and the femtocell receives the determining result of the management terminal, and determines, according to the determining result, whether to allow the access terminal to access the femtocell.

The server includes the home subscriber server HSS or the home location register HLR. That the femtocell obtains, from a server, the mobile phone number corresponding to the IMSI includes:

requesting, by the femtocell, the subscription information of the access terminal from the home subscriber server HSS or the home location register HLR; and receiving, by the femtocell, the subscription information of the access terminal from the HSS or the HLR, and obtaining, by parsing the subscription information, the mobile phone number that is of the access terminal and corresponding to the IMSI.

Figure 4:
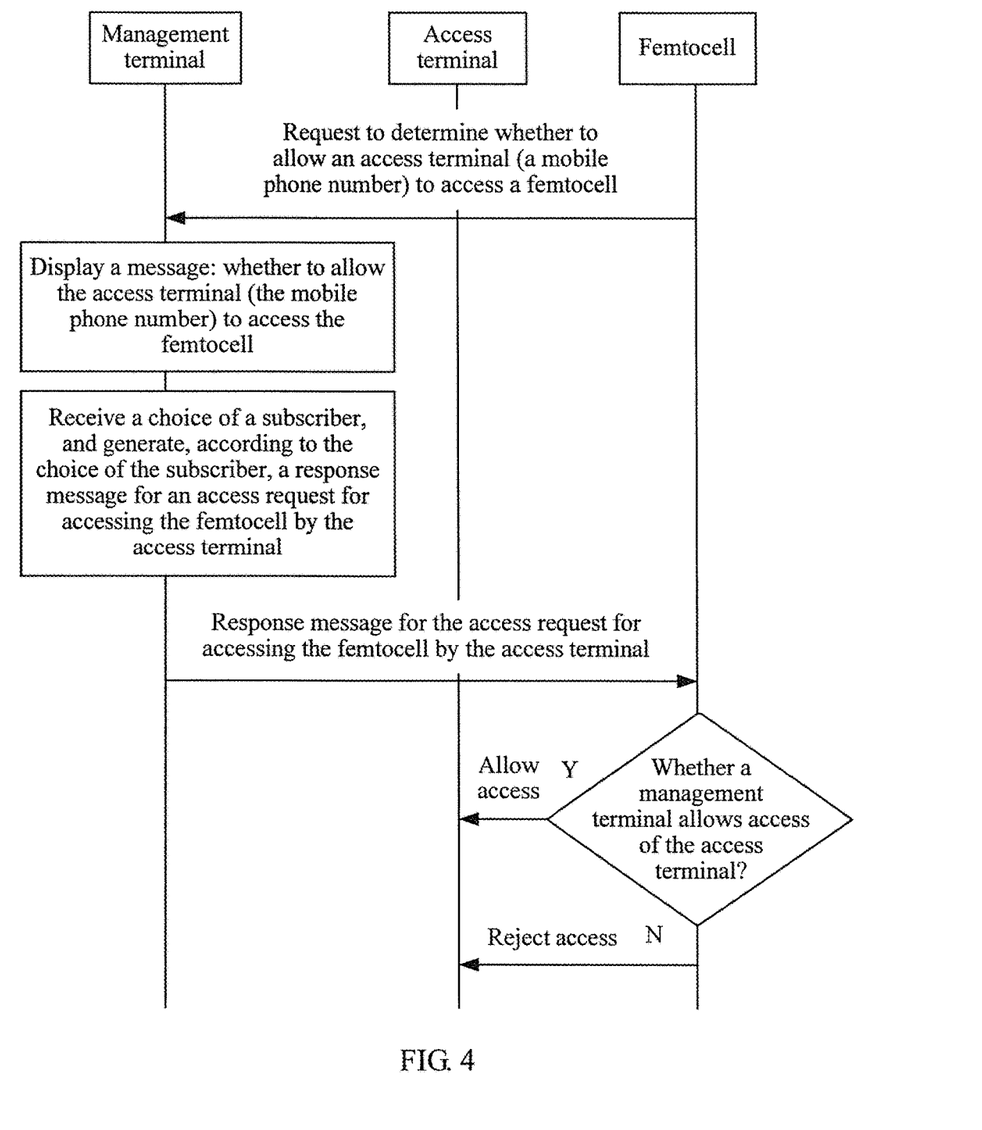
FIG. 4 is another schematic flowchart of a femtocell subscriber authentication method according to Embodiment 1 of the present application.
Figure 5:
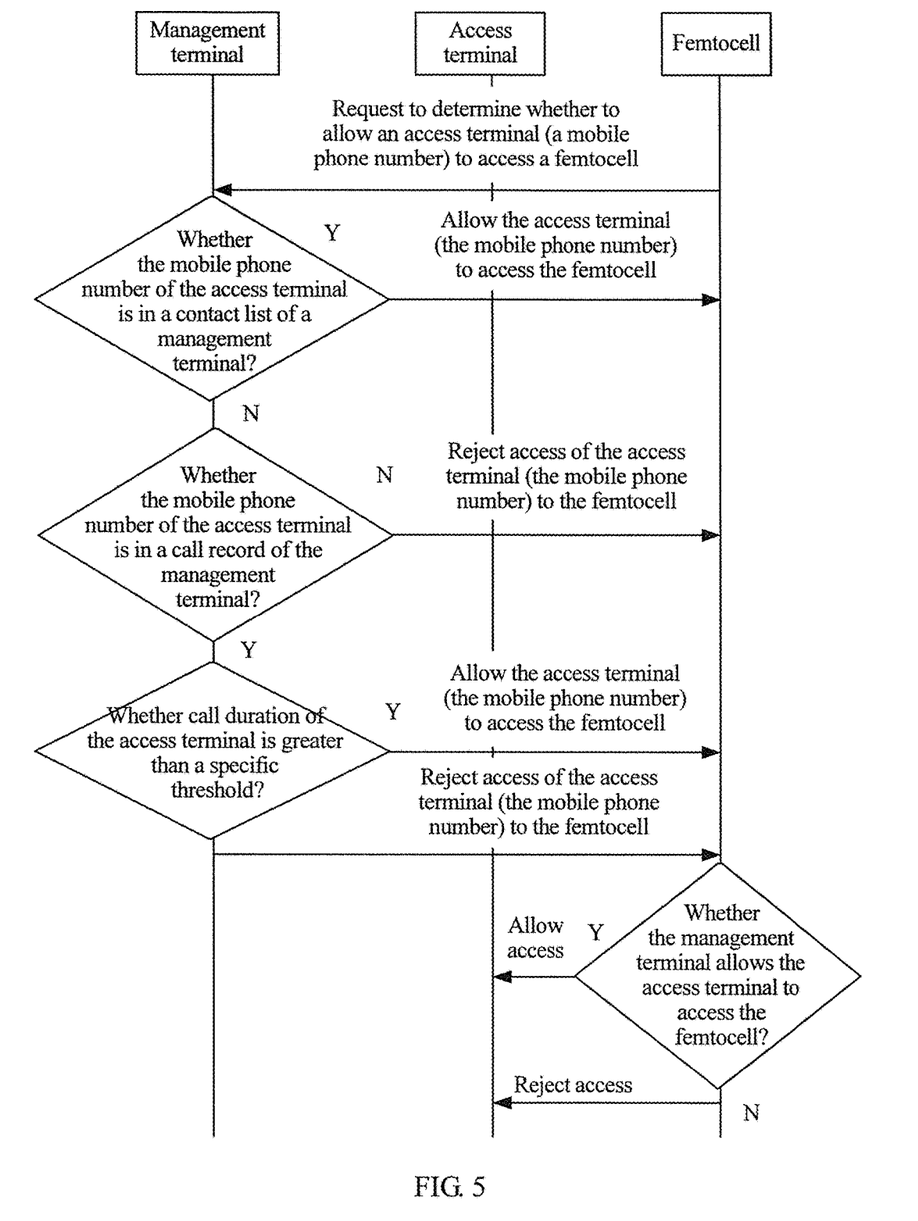
FIG. 5 is still another schematic flowchart of a femtocell subscriber authentication method according to Embodiment 1 of the present application.

In another aspect, as shown in FIG. 4 and FIG. 5, in the foregoing femtocell subscriber authentication method, the management terminal receives a determining request of the femtocell, where the determining request includes that the femtocell requests the management terminal to determine whether to allow the access terminal to access the femtocell, and the determining request carries an identifier ID of the access terminal or the mobile phone number of the access terminal; and the management terminal presents, to a subscriber of the management terminal, a dialog box about whether to allow the access terminal to access the femtocell or be added to the CSG subscriber list of the femtocell; and when the subscriber performs an operation of choosing to allow access, sends, to the femtocell, a determining result that the access terminal is allowed to access the femtocell; or when the subscriber performs an operation of choosing to reject access, sends, to the femtocell, a determining result that the access terminal is not allowed to access the femtocell; or the management terminal performs matching between the mobile phone number of the access terminal and a contact or a call record of the management terminal; and when the mobile phone number of the access terminal is in the contact or the call record of the management terminal, sends, to the femtocell, the determining result that the access terminal is allowed to access the femtocell; or when the mobile phone number of the access terminal is not in the contact or the call record of the management terminal, sends, to the femtocell, the determining result that the access terminal is not allowed to access the femtocell.

In addition, when the access number of the access terminal is in the call record of the management terminal, it is determined whether a quantity of call records or call duration of the access terminal exceeds a preset value; and when the quantity of call records or the call duration of the access terminal exceeds the preset value, the determining result that the access terminal is allowed to access the femtocell is sent to the femtocell; or when the quantity of call records or the call duration of the access terminal does not exceed the preset value, the determining result that the access terminal is not allowed to access the femtocell is sent to the femtocell.

When the foregoing femtocell receives the determining result or the response message indicating that the management terminal allows the access terminal to access the femtocell, the femtocell sends an access allow notification to the access terminal, and adds the access terminal to the closed subscriber group subscriber list of the femtocell.

When receiving the closed subscriber group subscriber list fed back by the femtocell, the terminal presents the subscriber list in an interface that is of the terminal and for managing the closed subscriber group subscriber list. When the closed subscriber group subscriber list fed back by the femtocell includes a subscriber ID and a mobile phone number, as shown in Table 1, the subscriber ID and the mobile phone number are directly displayed; or when the closed subscriber group subscriber list fed back by the femtocell includes only a mobile phone number, matching is performed between the mobile phone number fed back by the femtocell and a mobile phone number of the contact in the terminal. When a mobile phone number of a contact in the terminal matches the mobile phone number fed back by the femtocell, an ID of the matched contact is displayed in the subscriber ID; or when no mobile phone number of a contact in the terminal matches the mobile phone number fed back by the femtocell, the subscriber ID may be displayed as empty.

TABLE 1

| ID1 | Mobile phone number 1 |
|-----|-----------------------|
| ID2 | Mobile phone number 2 |
| ID3 | Mobile phone number 3 |
| ID4 | Mobile phone number 4 |
| ID5 | Mobile phone number 5 |
| ... | ...                   |

When adding a subscriber to the closed subscriber group subscriber list, the terminal may select, from a contact list of the terminal, a contact and a mobile phone number of the contact that need to be added, add the selected contact and the selected mobile phone number of the contact to a CSG subscriber list of the terminal, send information about the added contact and the added mobile phone number to the femtocell, and instruct the femtocell to add the contacts and the mobile phone numbers to the closed subscriber group subscriber list of the femtocell. After receiving the added contact and the added mobile phone number, the femtocell saves the added contacts and the added mobile phone numbers in the closed subscriber group subscriber list of the femtocell. Further, when an IMSI number corresponding to the mobile phone number is not stored in the femtocell, the femtocell requests, from the home subscriber server (Home Subscriber Server, HSS) or the home location register (Home Location Register, HLR), the IMSI number corresponding to the mobile phone number, and the femtocell saves the received IMSI number and the corresponding mobile phone number that is in the closed subscriber group subscriber list.

When deleting a subscriber from the CSG subscriber list, the terminal selects a corresponding subscriber from a CSG subscriber list, deletes a mobile phone number and a subscriber ID of the selected subscriber, sends the selected mobile phone number of the subscriber in the CSG ID subscriber list to the femtocell, and instructs the femtocell to delete information about the corresponding subscriber from the closed subscriber group subscriber list of the femtocell. After receiving the instruction, the femtocell deletes the information about the corresponding subscriber from the closed subscriber group subscriber list of the femtocell.

Embodiment 2

Figure 6:
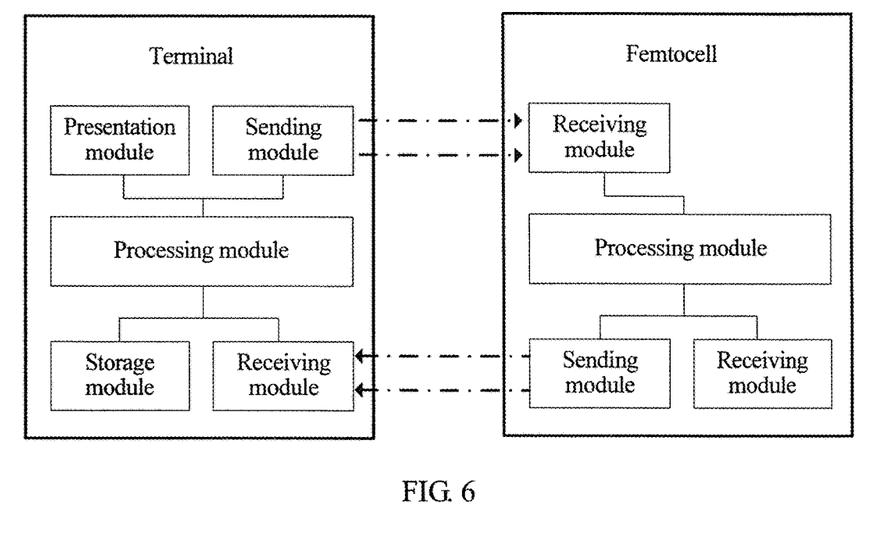
FIG. 6 is a schematic structural diagram of a femtocell and a terminal according to Embodiment 2 and Embodiment 3 of the present application.

As shown in FIG. 6, a wireless communications system in Embodiment 2 includes a femtocell, an access terminal, and a management terminal.

The access terminal initiates an access request to the femtocell, where the access request carries international mobile subscriber identity (IMSI, International Mobile Subscriber Identity) information of the access terminal;

after receiving the access request of the access terminal, the femtocell determines whether an IMSI of the access terminal is in a CSG subscriber list of the femtocell; and when the access terminal is in the CSG subscriber list, the femtocell allows the access terminal to access the femtocell; or when the IMSI of the access terminal is not in the CSG subscriber list of the femtocell, the femtocell obtains, from a server, a mobile phone number corresponding to the IMSI;

when the mobile phone number of the access terminal is not in the CSG subscriber list of the femtocell, the management terminal is requested to determine whether to allow the access terminal to access the femtocell;

after receiving, from the femtocell, a request message for requesting to determine whether to allow the access terminal to be added to the CSG subscriber list of the femtocell, the management terminal determines whether to allow the access terminal to access the femtocell, and sends the determining result to the femtocell; and when the management terminal allows the access terminal to access the femtocell, a response message indicating that access is allowed is sent to the access terminal; or when the management terminal does not allow the access terminal to access the femtocell, a response message indicating that access is rejected is sent.

When the mobile phone number of the access terminal is not in the CSG subscriber list of the femtocell, the management terminal is requested to determine whether to allow the access terminal to access the femtocell;

after receiving, from the femtocell, the request message for requesting to determine whether to allow the access terminal to be added to the CSG subscriber list of the femtocell, the management terminal determines whether to allow the access terminal to access the femtocell, and sends the determining result to the femtocell; and when the management terminal allows the access terminal to access the femtocell, the response message indicating that access is allowed is sent to the access terminal; or when the management terminal does not allow the access terminal to access the femtocell, the response message indicating that access is rejected is sent.

The foregoing femtocell includes:

a receiving module, configured to receive the access request sent by the access terminal, where the access request carries the IMSI information of the access terminal;

a sending module, configured to send information to a terminal or another base station;

a storage module, configured to store the CSG subscriber list; and a processing module, configured to: determine whether the international mobile subscriber identity IMSI of the access terminal is in the CSG subscriber list stored in the storage module; when the access terminal is in the closed subscriber group CSG subscriber list, allow the access terminal to access the femtocell; or when the IMSI of the access terminal is not in the CSG subscriber list of the femtocell, obtain, from the server by using the sending module and the receiving module, the mobile phone number corresponding to the IMSI; and when the mobile phone number of the access terminal is not in the CSG subscriber list of the femtocell, send a request to the management terminal by using the sending module, to request the management terminal to determine whether to allow the access terminal to access the femtocell; where the processing module determines, according to the determining result of the management terminal that is received by the receiving module, whether to allow the access terminal to access the femtocell.

The server includes a home subscriber server HSS or a home location register HLR, and that the processing module obtains, from the server by using the sending module and the receiving module, the mobile phone number corresponding to the IMSI includes:

requesting, by the sending module, subscription information of the access terminal from the HSS or the HLR;

receiving, by the receiving module, the subscription information of the access terminal from the HSS or the HLR; and obtaining, by the processing module by parsing the subscription information, the mobile phone number that is of the access terminal and corresponding to the IMSI.

The foregoing management terminal includes:

a receiving module, configured to receive a determining request of the femtocell, where the determining request includes that the femtocell requests the management terminal to determine whether to allow the access terminal to access the femtocell, and the determining request carries an identifier ID of the access terminal or the mobile phone number of the access terminal;

a storage module, configured to store the CSG subscriber list, a contact, and a call record;

a presentation module, configured to present, to a subscriber of the management terminal, a dialog box about whether to allow the access terminal to access the femtocell or be added to the CSG subscriber list of the femtocell;

a sending module, configured to: when the subscriber performs an operation of choosing to allow access, send, to the femtocell, a determining result that the access terminal is allowed to access the femtocell; or when the subscriber performs an operation of choosing to reject access, send, to the femtocell, a determining result that the access terminal is not allowed to access the femtocell; and a processing module, configured to: match the mobile phone number of the access terminal and the contact or the call record stored in the storage module; and when the mobile phone number of the access terminal is in the contact or the call record of the management terminal, send, to the femtocell by using the sending module, the determining result that the access terminal is allowed to access the femtocell; or when the mobile phone number of the access terminal is not in the contact or the call record, send, to the femtocell by using the sending module, the determining result that the access terminal is not allowed to access the femtocell; where the processing module is configured to: when the access number of the access terminal is in the call record of the management terminal, determine whether a quantity of call records or call duration of the access terminal exceeds a preset value; and when the quantity of call records or the call duration of the access terminal exceeds the preset value, send, to the femtocell by using the sending module, the determining result that the access terminal is allowed to access the femtocell; or when the quantity of call records or the call duration of the access terminal does not exceed the preset value, send, to the femtocell by using the sending module, the determining result that the access terminal is not allowed to access the femtocell.

Embodiment 3

As shown in FIG. 6, Embodiment 4 of the present application provides a femtocell, and the femtocell includes:

a sending module, configured to broadcast a closed subscriber group identity (CSG ID, Closed Subscriber Group Identity) of the femtocell, where only a terminal that belongs to the closed subscriber group can access the femtocell;

a receiving module, configured to receive a request of an access terminal, where the request includes that the access terminal requests a current closed subscriber group subscriber list of the femtocell from the femtocell;

a storage module, configured to store the CSG ID and the current closed subscriber group subscriber list; and a processing module, configured to: determine whether the access terminal has permission to manage the closed subscriber group subscriber list of the femtocell; and when the access terminal has the permission to manage the closed subscriber group subscriber list of the femtocell, feed back the current closed subscriber group subscriber list of the femtocell to the terminal, where the closed subscriber group subscriber list fed back by the femtocell includes a mobile phone number of at least one terminal; where the receiving module is further configured to receive the modified closed subscriber group subscriber list of the femtocell that is sent by the access terminal, where the modification includes adding, deleting, or changing, by the access terminal, a subscriber in the closed subscriber group subscriber list of the femtocell.

As shown in FIG. 6, Embodiment 4 of the present application further provides a terminal, and the terminal includes:

a receiving module, configured to receive a closed subscriber group identity broadcast by a femtocell;

a sending module, configured to send information to the femtocell;

a storage module, configured to store a closed subscriber group identity list; and a processing module, configured to: determine whether the closed subscriber group identity is in the closed subscriber group identity list stored in the storage module; and when the closed subscriber group identity is in the closed subscriber group identity list stored in the storage module, send an access request to the femtocell by using the sending module; where after the terminal successfully accesses the femtocell, the processing module requests a current closed subscriber group subscriber list of the femtocell from the femtocell by using the sending module; and after the receiving module receives the closed subscriber group subscriber list of the femtocell, the processing module manages the closed subscriber group subscriber list of the femtocell, where the management includes adding, deleting, or changing a subscriber in the subscriber list.

The processing module is further configured to obtain schedule information from a schedule stored in the storage module, to determine whether a visitor performs access and determine a mobile phone number and an access time of the visitor; and according to the access time of the visitor, before the visitor performs access, instruct, by using the sending module, the femtocell to add the mobile phone number of the visitor to the closed subscriber group subscriber list of the femtocell; and after the access time elapses, instruct, by using the sending module, the femtocell to delete the mobile phone number of the visitor from the closed subscriber group subscriber list.

The sending module sends a request to the femtocell to request the femtocell to detect whether a terminal subscriber in the closed subscriber group subscriber list is in a coverage area of the femtocell; and when the processing module determines, according to a detection result of the femtocell, that in a specific time period, the terminal subscriber does not report the measurements or does not access the femtocell, the processing module instructs the femtocell to delete the terminal subscriber from the closed subscriber group subscriber list of the femtocell, where the period is longer than a scheduling period of the femtocell in a wireless communications system.

The terminal further includes a presentation module, configured to: present the subscriber list in an interface that is of the terminal and for managing the closed subscriber group subscriber list; when the closed subscriber group subscriber list fed back by the femtocell includes a subscriber ID and a mobile phone number, directly display the subscriber ID and the mobile phone number; or when the closed subscriber group subscriber list fed back by the femtocell includes only a mobile phone number, match the mobile phone number fed back by the femtocell and a mobile phone number of a contact in the terminal; and when a mobile phone number of a contact in the terminal matches the mobile phone number fed back by the femtocell, display an ID of the matched contact in the subscriber ID; or when no mobile phone number of a contact in the terminal matches the mobile phone number fed back by the femtocell, display the subscriber ID as empty.

The processing module is configured to: select, from a contact list stored in the storage module, a contact and a mobile phone number corresponding to the contact that need to be added, or only a mobile phone number that needs to be added; add the selected contact and the selected mobile phone number corresponding to the contact or only the selected mobile phone number to a closed subscriber group subscriber list of the terminal; send, to the femtocell, information about the added contact and the added mobile phone number, or only the mobile phone number that needs to be added; and instruct the femtocell to add the contact and the mobile phone number or only the mobile phone number to the closed subscriber group subscriber list of the femtocell.

In the foregoing specific implementation manners, the objective, technical solutions, and benefits of the present application are further described in detail. It should be understood that the foregoing descriptions are merely specific implementation manners of the present application, but are not intended to limit the protection scope of the present application. Any modification, equivalent replacement, or improvement made without departing from the principles of the present application should fall within the protection scope of the present application.

What is claimed is:

1. A femtocell subscriber authentication method, comprising:
receiving, by a femtocell, an access request sent by an access terminal, wherein the access request carries an International Mobile Subscriber Identity (IMSI) of the access terminal;
determining, by the femtocell, whether the IMSI of the access terminal is in a closed subscriber group subscriber list of the femtocell;
when the IMSI of the access terminal is in the closed subscriber group subscriber list of the femtocell, allowing the access terminal to access the femtocell;
when the IMSI of the access terminal is not in the closed subscriber group subscriber list of the femtocell, obtaining, by the femtocell from a server, a mobile phone number of the access terminal corresponding to the IMSI;
when the mobile phone number of the access terminal is not in the closed subscriber group subscriber list of the femtocell, sending, by the femtocell, a request to a management terminal to determine whether to allow the access terminal to access the femtocell, wherein the request includes the mobile phone number of the access terminal;
receiving, by the femtocell, a determining result, of the management terminal, of whether to allow access of the access terminal, and determining, according to the determining result, whether to accept the access request of the access terminal, wherein the determining result is based on whether the mobile phone number of the access terminal is in a contact list or a call record of the management terminal, and the determining result is further based on whether a quantity of call records of the access terminal exceeds a preset value, wherein when the quantity of call records of the access terminal exceeds the preset value, the determining result is that the management terminal allows the access terminal to access the femtocell, and when the quantity of call records of the access terminal does not exceed the preset value, the determining result is that the management terminal does not allow the access terminal to access the femtocell;
when the determining result is that the management terminal allows the access terminal to access the femtocell, sending, to the access terminal, a first response message indicating that access of the access terminal is allowed; and
when the determining result is that the management terminal does not allow the access terminal to access the femtocell, sending, to the access terminal, a second response message indicating that access of the access terminal is rejected.

2. The femtocell subscriber authentication method according to claim 1, wherein:
the server comprises a home subscriber server (HSS) or a home location register (HLR); and
obtaining, by the femtocell from a server, a mobile phone number of the access terminal corresponding to the IMSI comprises:
requesting, by the femtocell, subscription information of the access terminal from the HSS or the HLR, and
receiving, by the femtocell, the subscription information of the access terminal from the HSS or the HLR, and obtaining, by parsing the subscription information, the mobile phone number of the access terminal corresponding to the IMSI.

3. The femtocell subscriber authentication method according to claim 1, wherein the first response message is an access allow notification, the method further comprising:
when the determining result is that the management terminal allows the access terminal to access the femtocell, adding the access terminal to the closed subscriber group subscriber list of the femtocell.

4. A femtocell subscriber authentication method, comprising:
receiving, by a management terminal, a determining request of a femtocell, wherein the determining request is for requesting the management terminal to determine whether to allow an access terminal to access the femtocell, and the determining request carries an identifier ID of the access terminal or a mobile phone number of the access terminal;
determining, by the management terminal, whether the mobile phone number of the access terminal is in a contact list or a call record of the management terminal;
when the mobile phone number of the access terminal is not in the contact list or the call record of the management terminal, sending, to the femtocell, a first determining result that the access terminal is not allowed to access the femtocell;

when the mobile phone number of the access terminal is in the contact list of the management terminal, sending, to the femtocell, a second determining result that the access terminal is allowed to access the femtocell;

when the mobile phone number of the access terminal is in the call record of the management terminal, determining, by the management terminal, whether a quantity of call records or a call duration of the access terminal exceeds a preset value;

when the quantity of call records or the call duration of the access terminal exceeds the preset value, sending, to the femtocell, a third determining result that the access terminal is allowed to access the femtocell; and when the quantity of call records or the call duration of the access terminal does not exceed the preset value, sending, to the femtocell, a fourth determining result that the access terminal is not allowed to access the femtocell.

5. A femtocell, comprising:

a receiving device, configured to receive an access request sent by an access terminal, wherein the access request carries an international mobile subscriber identity (IMSI) of the access terminal;

a sending device, configured to send information to a terminal or another base station;

a storage device, configured to store a closed subscriber group subscriber list; and a processor, configured to:
  determine whether the IMSI of the access terminal is in the closed subscriber group subscriber list stored in the storage device;
  when the IMSI of the access terminal is in the closed subscriber group subscriber list, allow the access terminal to access the femtocell;
  when the IMSI of the access terminal is not in the closed subscriber group subscriber list of the femtocell, obtain, from a server by using the sending device and the receiving device, a mobile phone number of the access terminal corresponding to the IMSI;
  when the mobile phone number of the access terminal is not in the closed subscriber group subscriber list of the femtocell, send a request to a management terminal by using the sending device, to request the management terminal to determine whether to allow the access terminal to access the femtocell, wherein the request includes the mobile phone number of the access terminal;
  analyze a determining result of the management terminal that is received by the receiving device, and determine, according to the determining result, whether to allow the access terminal to access the femtocell, wherein the determining result is based on whether the mobile phone number of the access terminal is in a contact list or a call record of the management terminal, and the determining result is further based on whether a quantity of call records of the access terminal exceeds a preset value, wherein when the quantity of call records of the access terminal exceeds the preset value, the determining result is that the management terminal allows the access terminal to access the femtocell, and when the quantity of call records of the access terminal does not exceed the preset value, the determining result is that the management terminal does not allow the access terminal to access the femtocell;
  when the determining result is that the management terminal allows the access terminal to access the femtocell, control the sending device to send, to the access terminal, a first response message indicating that access of the access terminal is allowed; and
  when the determining result is that the management terminal does not allow the access terminal to access the femtocell, control the sending device to send, to the access terminal, a second response message indicating that access of the access terminal is rejected.

6. The femtocell according to claim 5, wherein:

the server comprises a home subscriber server (HSS) or a home location register (HLR); and the processor is further configured to
  request subscription information of the access terminal from the HSS or the HLR;
  receive the subscription information of the access terminal from the HSS or the HLR; and
  obtain, by parsing the subscription information, the mobile phone number of the access terminal that corresponds to the IMSI.

* * * * *